(12) United States Patent
Cummings

(10) Patent No.: US 6,540,433 B2
(45) Date of Patent: Apr. 1, 2003

(54) SELF-ADJUSTING FASTENER AND METHOD FOR USING SAME

(75) Inventor: Stephan A. Cummings, Newton, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/851,863

(22) Filed: May 9, 2001

(65) Prior Publication Data

US 2002/0168224 A1 Nov. 14, 2002

(51) Int. Cl.[7] ................................................ B25G 3/18
(52) U.S. Cl. ...................... 403/408.1; 403/321; 292/25; 292/101
(58) Field of Search ............................. 292/25, 31, 33, 292/42, 101, 96, 103, DIG. 69, 256.71, 256.73; 403/408.1, 286, 287, 291, 373, 374.1–3, 376, 321, 324, 322.1, 83, 84, 100, 101, 103–105, 107, 108, 167, 168, 341; 68/3 R; 211/192

(56) References Cited

U.S. PATENT DOCUMENTS

| | | | |
|---|---|---|---|
| 422,739 A | * | 3/1890 | Darmstadt .................. 292/25 |
| 1,322,246 A | | 11/1919 | Krekow |
| 1,343,089 A | | 6/1920 | Ruquet, Jr. |
| 1,452,777 A | | 4/1923 | Band |
| 1,487,184 A | | 3/1924 | Saunier |
| 1,964,116 A | | 6/1934 | Hackett |
| 3,700,292 A | | 10/1972 | Owens |
| 4,070,120 A | | 1/1978 | Bald et al. |
| 4,846,615 A | | 7/1989 | Forsyth |
| 5,167,464 A | | 12/1992 | Voellmer |
| 5,351,456 A | | 10/1994 | Paine, Jr. |

FOREIGN PATENT DOCUMENTS

FR    2 701 056    * 8/1994

* cited by examiner

Primary Examiner—Lynne H. Browne
Assistant Examiner—Michael P Ferguson
(74) Attorney, Agent, or Firm—McKee, Voorhees & Sease, P.L.C.

(57) ABSTRACT

A fastening member is either retentively engaging or contacting a one piece member, and includes a biasing slot therein. A screw extends through the biasing slot and engages at least one biasing member on one side of the slot. The screw extends into the other piece, and rotation of the screw draws the first piece and the second piece together.

17 Claims, 3 Drawing Sheets

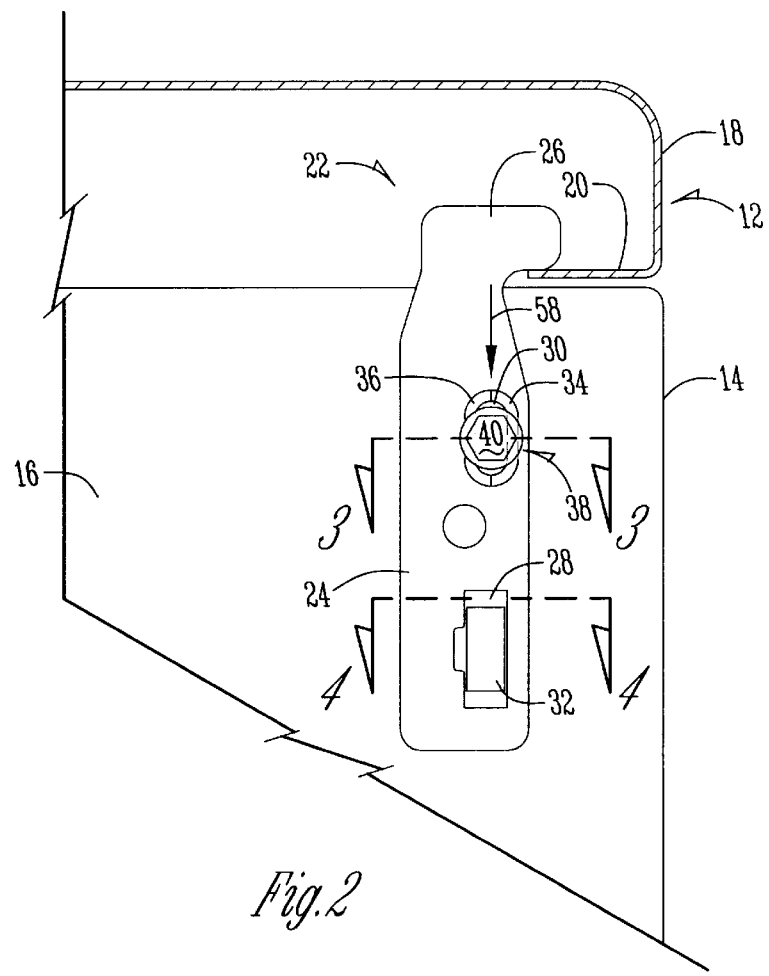
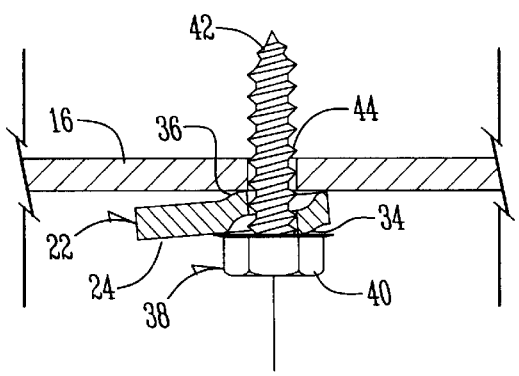
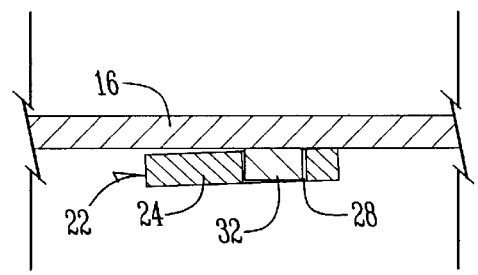

SELF-ADJUSTING FASTENER AND METHOD FOR USING SAME

BACKGROUND OF THE INVENTION

The present invention relates to a self-adjusting fastener and method for using same.

In many situations it is desirable to be able to draw two pieces toward one another for final attachment. A typical example of this is in the fastening of a top cover to the cabinet of an appliance. The attachment of the top cover to the appliance requires drawing the top cover towards the remainder of the appliance cabinet in such a way that there is no vibration during the operation of the appliance.

While the attachment of a top cover to an appliance cabinet is one example of the use of the present invention, there can be many other applications where it is desirable to attach two parts together tightly.

Therefore a primary object of the present invention is the provision of an improved self-adjusting fastener and method for using same.

A further object is the provision of an improved self-adjusting fastener which requires a minimum of moving parts, and which can draw two pieces together merely by the turn of a screw.

A further object of the present invention is the provision of an improved self-adjusting fastener which is capable of drawing a top cabinet tightly down against the remaining cabinet of an appliance.

A further object of the present invention is the provision of a self-adjusting fastener and method for using same which is simple to use, economical in manufacture and durable in use.

BRIEF SUMMARY OF THE INVENTION

The foregoing objects may be achieved by a combination of a first part and a second part positioned closely adjacent one another. A fastening member is movably attached to the first part for movement in a first direction away from the second member. A securing member is mounted for movement with respect to the fastening member. A bias member is on the fastening member and engages the securing member. It is adapted to cause the fastening member to move in the first direction in response to movement of the securing member with respect to the fastening member. The fastening member includes a portion thereof engaging the second member and pulling the second member toward the first member in response to movement of the fastening member in its first direction.

According to one feature of the invention the fastening member is a piece separate from the second piece.

According to another feature of the invention the fastening member is an integral part of the second piece.

According to another feature of the present invention the securing member is mounted for rotation with respect to the fastening member and the bias member causes movement of the second member towards the first member in response to the rotation of the securing member.

According to another feature of the invention the fastening member includes a slot therein and the bias member is adjacent the slot. The securing member extends within the slot and engages the bias member.

According to another feature of the invention the fastening member includes a guide slot therein. A guide member is connected to the first piece and extends within the guide slot to guide the fastening member for movement in its first direction during rotation of the securing member.

The present invention may also be used to force two members apart as well as to draw two members together.

BRIEF DESCRIPTION OF THE DRAWINGS

FIG. 2 is a front elevational view taken along line 2—2 of FIG. 1.

FIG. 3 is a sectional view taken along line 3—3 of FIG. 2.

FIG. 4 is a sectional view taken along line 4—4 of FIG. 2.

DETAILED DESCRIPTION OF THE INVENTION

Figure 1:
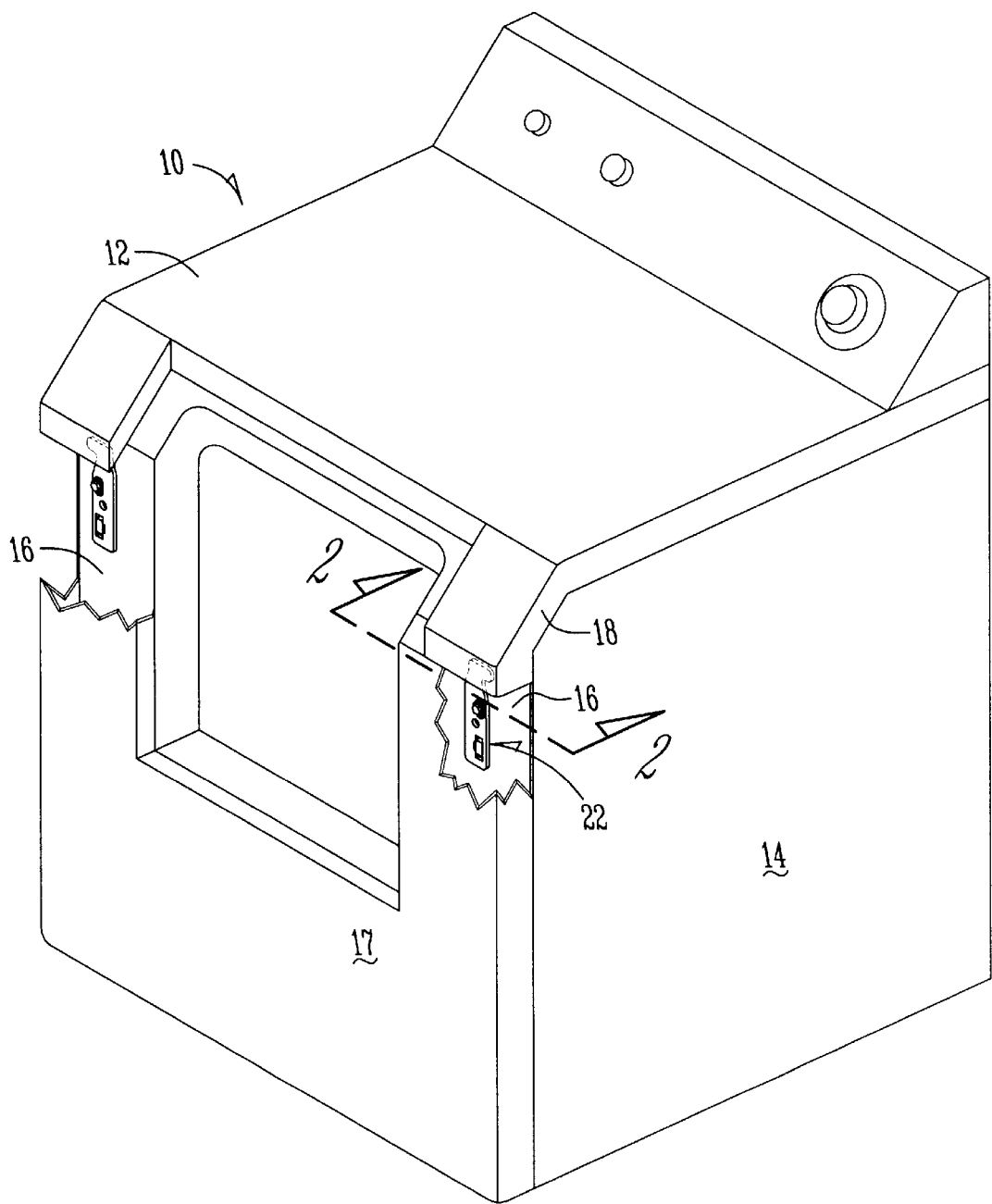
FIG. 1 is a perspective view of an appliance having a top cover secured to the cabinet with the self-adjusting fastener of the present invention.

Referring to the drawings the numeral 10 generally designates a washing machine. Washing machine 10 includes a top cover 12, cabinet side walls 14 and a cabinet front wall 16. Front wall 16 is shown with its covering apron 17 cut away so as to expose fastening means of the present invention.

The top cover 12 includes a side wall 18 (FIG. 2) and an inwardly extending flange 20 which rests upon the top of the cabinet walls 14, 16.

Fastening member or strap 22 is formed in the shape of a first leg 24 and a second leg 26. The fastening member or strap 22 is in the form of a plate and includes one face abutting against the cabinet front wall 16 and another opposite face facing outwardly away from the cabinet front wall 16.

A guide slot 28 is provided in the bottom of first leg 24. A bias slot 30 is provided in the upper end of the first leg 24.

A guide tab 32 is operatively attached to the front wall 16 and protrudes within the guide slot 28. The bias slot 30 includes a first bias ridge 34 along one edge of bias slot 30 and protruding in one direction from its front face. A second bias ridge 36 is on the opposite edge of bias slot 30 and is protruding in the opposite direction from the back face of fastening member 22. The protrusion of the bias ridges 34, 36 can best be seen in FIG. 3.

A screw or tightening member 38 extends within bias slot 30 and includes a screw head 40 and a threaded screw shank 42. Screw shank 42 extends within a screw receiving hole 44 in the front wall 16. It is possible to have threads on the interior of screw receiving hole 44 as shown in FIG. 3, or it is also possible to provide a member (not shown) on the inside of the front wall 16 and threadably engaging the inner end of shank 42. It is also possible to use a self tapping screw in the place of screw 38, in which case hole 44 is modified to accommodate a self tapping screw.

As can be seen in FIG. 2 the second leg 26 of fastening member 22 engages the upper surface of flange 20 of the top cover 12. As screw 38 is tightened within slot 30, the interaction between the first bias ridge 34 and the screw head 40 causes the fastening member 22 to be drawn downwardly in the direction of the arrow indicated by the numeral 58. The second biasing member 36 does not participate in this interaction, but the use of the fastening member 22 on the left-hand side of the cabinet as shown in FIG. 1 permits the interaction between the screw head 40 and the second biasing ridge 36. On the left side of appliance 10 the fastening member 22 is reversed with the second leg 26 engaging a flange (not shown) on the left-hand side of the cabinet similar to flange 20. Thus the fastening member 22 can be used on the right-hand side of the cabinet, in which case first ridge 34 is utilized, or it can be reversed and used on the left-hand side of the cabinet in FIG. 1 with the second ridge 36 being employed. Structure of the fastening member 22 is the same in either case.

While the use of a screw 38 is shown, other movable or rotatable members could be utilized without detracting from the invention. Similarly, the particular configuration of the bias ridges 33, 36 can be varied without detracting from the invention. All that is required is that the fastening member 22 be movable in a downward direction in response to movement or rotation of the screw 38 within the slot 30.

Figure 5:
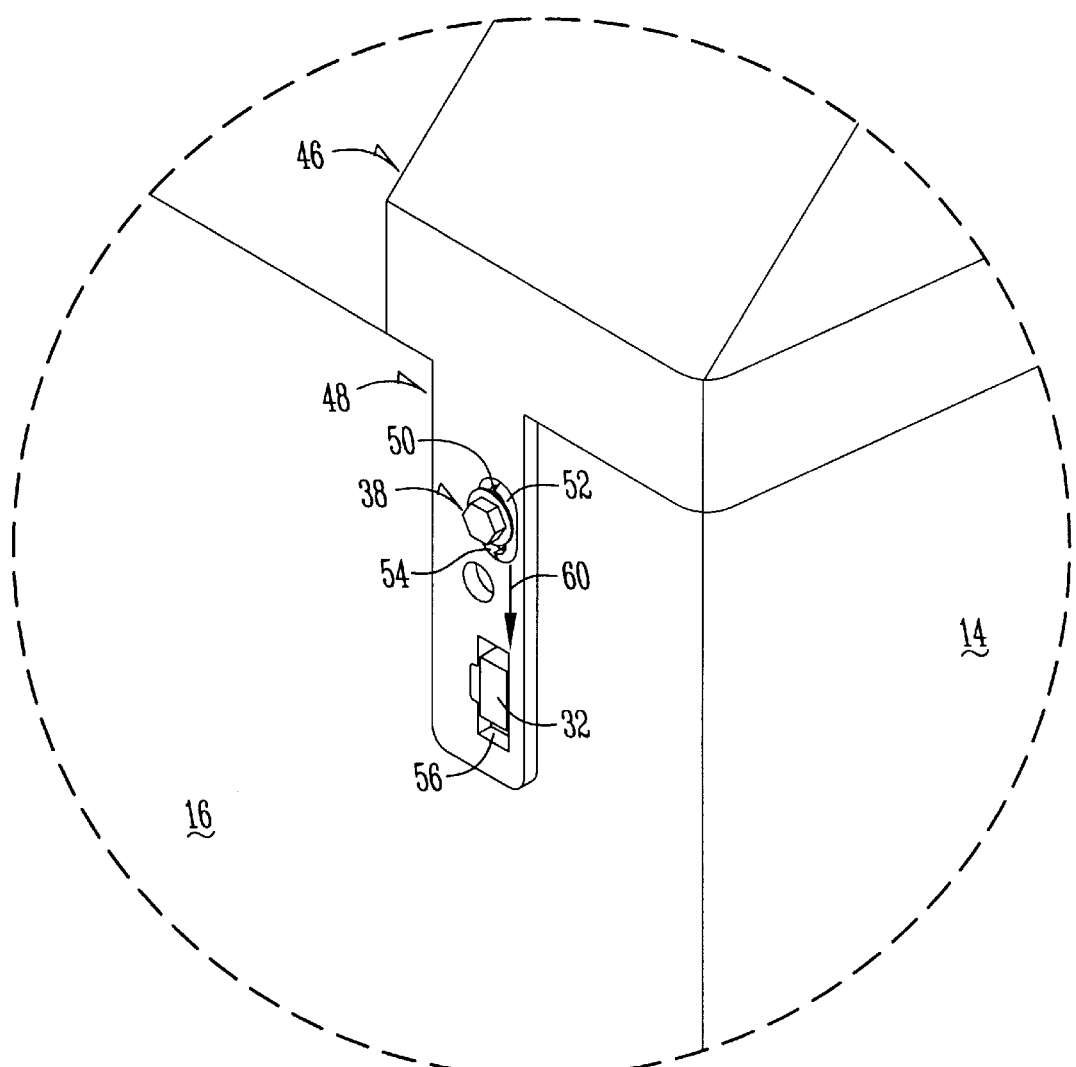
FIG. 5 is a perspective view of a modified form of the self-adjusting fastener.

Referring to FIG. 5 a modified form of the invention is shown. FIG. 5 shows a modified top cover 46 which includes a fastening member 48 formed integrally therewith. The fastening member 48 extends downwardly and includes a biased slot 50 having bias ridges 52, 54 on its edges. A guide slot 56 is provided in the bottom of fastening member 48. The bias ridges 52, 54 are the same as set forth in FIGS. 1–3, and the method of operation of the device is the same.

Rotation of the screw 38 causes the fastening member 48 to be drawn downwardly in the direction of arrow 60. Because the fastening member is attached to the top cover 46 it draws the top cover downwardly into tight engagement with the top edge of the cabinet front wall 16.

The present invention may also be used to force two items apart as well as draw them together. In that application the bias ridges 52, 54 are placed on the left side of slot 50, rather than on the right as shown in the drawings. Rotation of screw 38 in a clockwise direction then causes the parts to be forced apart, rather than drawn together. The same effect can be obtained with the original bias ridges 52,54 shown in the drawings by using a reversed threaded screw 30 which, when rotated in a counterclockwise direction causes the parts to be forced apart.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A combination comprising:
    a first part and a second part positioned closely adjacent one another, said first part having a screw receiving hole therein;
    a fastener strap connected to said second part and having first and second opposite flat faces and a bias slot extending there through;
    said first flat face of said fastener strap facing toward and engaging said first part;
    said bias slot being elongated, having a longitudinal axis and first and second opposite side margins;
    a first bias ridge adjacent said first side margin protruding outwardly away from said second flat surface and away from said first part;
    a screw having a screw shank and a screw head, said screw shank extending through said bias slot and being threaded within said screw receiving hole; and
    said screw head engaging said first bias ridge adjacent said first margin of said slot and also engaging said second margin of said slot, whereby interaction of said screw head with said first bias ridge during rotation of said screw head causes said fastener strap to move in a first direction pulling said second part towards said first part.

2. A combination according to claim 1 wherein said fastener strap is an integral part of said second part.

3. A combination according to claim 1 wherein said fastener strap is a separate part from said second part.

4. A combination according to claim 3 wherein said fastener strap includes an attachment portion engaging said second part for pulling said second part toward said first part during said rotation of said screw.

5. A combination according to claim 1 wherein said screw shank is threaded within said screw receiving hole in said first part.

6. A combination according to claim 1 wherein said screw shank is not threaded within said screw receiving hole and a securing member separate from said first part is threaded to said screw shank for attaching said screw and said fastening strap to said first part.

7. A combination according to claim 1 wherein said fastening strap includes a guide slot therein and said first part includes a guide member protruding into said slot for guiding said fastening strap during movement in said first direction.

8. A combination comprising:
    a first part and a second part positioned closely adjacent one another;
    a fastening member movably attached to said first part for movement in a first direction relative to said second part;
    a securing member mounted for movement with respect to said fastening member;
    a bias member on said fastening member and engaging said securing member, said bias member being adapted to cause said fastening member to move in said first direction in response to movement of said securing member with respect to said fastening member;
    said bias member having an elongated bias slot having a longitudinal axis and a first and second opposite side margins;
    said bias member having first and second opposite flat faces;
    a first bias ridge adjacent said first side margin protruding outwardly away from said second flat surface and away from said first part;
    said fastening member having a portion thereof engaging said second part and moving said second part relative to said first part in response to movement of said fastening member in said first direction.

9. A combination according to claim 8 wherein said securing member is mounted for rotation with respect to said fastening member, said bias member causing said movement of said second member toward said first member in response to rotation of said securing member.

10. A combination according to claim 9 wherein said bias member is integral with said fastening member.

11. A combination according to claim 9 wherein said bias member is separate from, but attached to, said fastening member.

12. A combination according to claim 9 wherein said fastening member includes a slot therein, said biasing member being adjacent said slot, said securing member extending within said slot and engaging said biasing member.

13. A combination according to claim 12 wherein said fastening member further includes a guide slot therein and said first part includes a guide member extending within said guide slot to guide said fastening member for movement in said first direction during rotation of said securing member.

14. A method for moving a first piece relative to a second piece comprising:

mounting a fastening member to said first piece for movement in a first direction with respect to said first piece;

retentively engaging said second piece with a portion of said fastening member for moving said second piece relative to said first piece in response to movement of said fastening member in said first direction;

engaging a biasing member on said fastening member with a tightening member mounted for rotation with respect to said biasing member; and rotating said tightening member with respect to said biasing member whereby interaction between said tightening member and said biasing member causes movement of said fastening member in said first direction to move said second piece relative to said first piece wherein said rotation of said tightening member causes said second piece to move away from said first piece.

15. A method according to claim 14 and further comprising guiding said fastening member during movement in said first direction by using a guide slot in said fastening member and a guide member attached to said first piece and fitting within said guide slot.

16. A method according to claim 14 and further comprising extending said tightening member through a bias slot in said fastening member during said rotation of said tightening member.

17. A method according to claim 14 wherein said rotation of said tightening member causes said second piece to move toward said first piece.

* * * * *